(12) United States Patent
Barrus

(10) Patent No.: US 10,482,007 B2
(45) Date of Patent: Nov. 19, 2019

(54) MEMORY ALLOCATION ON NON-VOLATILE STORAGE

(71) Applicant: NOBLIS, INC., Falls Church, VA (US)

(72) Inventor: Tyler W. Barrus, Midlothian, VA (US)

(73) Assignee: NOBLIS, INC., Reston, VA (US)

( * ) Notice: Subject to any disclaimer, the term of this patent is extended or adjusted under 35 U.S.C. 154(b) by 79 days.

(21) Appl. No.: 15/370,566

(22) Filed: Dec. 6, 2016

(65) Prior Publication Data

US 2018/0157585 A1   Jun. 7, 2018

(51) Int. Cl.
| | | |
|---|---|---|
| *G06F 12/00* | (2006.01) | |
| *G06F 9/00* | (2006.01) | |
| *G06F 12/02* | (2006.01) | |
| *G06F 9/445* | (2018.01) | |

(52) U.S. Cl.
CPC ...... *G06F 12/0223* (2013.01); *G06F 9/44573* (2013.01); *G06F 12/023* (2013.01); *G06F 12/0238* (2013.01); *G06F 2212/1044* (2013.01); *G06F 2212/1048* (2013.01); *G06F 2212/202* (2013.01); *G06F 2212/7202* (2013.01)

(58) Field of Classification Search
None
See application file for complete search history.

(56) References Cited

U.S. PATENT DOCUMENTS

| | | | | |
|---|---|---|---|---|
| 6,442,660 B1* | 8/2002 | Henerlau | ............ | G06F 9/44573 707/999.202 |
| 6,611,952 B1* | 8/2003 | Prakash | .............. | G06F 17/5045 716/102 |
| 7,558,935 B1* | 7/2009 | Boucher | ............... | G06F 8/4441 711/132 |
| 2002/0095453 A1* | 7/2002 | Steensgaard | .......... | G06F 9/5016 718/107 |
| 2004/0088701 A1* | 5/2004 | Hatalkar | ............. | G06F 9/44573 718/100 |
| 2008/0282022 A1* | 11/2008 | Gonikberg | .......... | G06F 12/0638 711/102 |
| 2009/0183181 A1* | 7/2009 | Subhraveti | ............ | G06F 9/4856 719/320 |
| 2011/0099339 A1* | 4/2011 | Hagiwara | .............. | G03G 15/50 711/154 |

(Continued)

*Primary Examiner* — Reginald G Bragdon
*Assistant Examiner* — Michael L Westbrook
(74) *Attorney, Agent, or Firm* — Morrison & Foerster LLP

(57) ABSTRACT

Techniques for allocating memory on non-volatile storage mediums, rather than on RAM storage mediums, are provided. In some embodiments, first functions in program code for allocating memory on RAM storage are replaced with corresponding second functions for allocating memory on non-volatile storage. Library files corresponding to the second functions may be stored in programming language libraries, such that the second function may be defined in order to allocate memory on non-volatile storage. In some embodiments, a library file for allocating memory on RAM storage may be modified such that it instead causes allocation of memory on non-volatile storage. Allocating memory, storing data in memory, or retrieving data in memory may, in some embodiments, include providing instructions for a processor to communicate via a bus associated with non-volatile storage rather than a bus associated with RAM storage.

16 Claims, 5 Drawing Sheets

(56) References Cited

U.S. PATENT DOCUMENTS

| | | | |
|---|---|---|---|
| 2012/0266028 A1* | 10/2012 | Liu | G06F 11/366 714/42 |
| 2014/0215177 A1* | 7/2014 | Kim | G06F 1/3275 711/171 |
| 2014/0223098 A1* | 8/2014 | Lee | G06F 9/5016 711/118 |
| 2016/0011799 A1* | 1/2016 | Yu | G06F 3/0616 711/103 |

* cited by examiner

MEMORY ALLOCATION ON NON-VOLATILE STORAGE

FIELD OF THE INVENTION

The present disclosure relates generally to memory allocation.

BACKGROUND OF THE INVENTION

In modern computer systems, memory for executing program code is allocated on RAM storage mediums. RAM storage mediums are volatile computer data storage mediums that generally have faster read/write times, faster bus speeds, and configurations that enable faster communication with processors of the computer system as compared to computer data storage mediums in the computer system aside from RAM storage. Namely, data storage such as solid state drives, hard disk drives, magnetic storage, optical storage, CD-ROM drives, tape drives, and the like generally have considerably slower read/write times and bus speeds as compared to RAM storage. As these other forms of data storage are generally non-volatile data storage, they are used for longer-term data storage (e.g., to non-transiently store or save information) rather than merely for temporarily storing data used in the execution of a computer program.

As modern computing applications require ever-increasing amounts of memory for execution. The current solution is to simply provide ever-increasing amounts of RAM storage to attempt to meet the demands for increased memory. However, large amounts of RAM storage can be cost prohibitive, as RAM storage is substantially more expensive than leading forms of non-volatile (e.g., non-RAM) data storage, namely hard disk drives and solid state drives. In instances in which extremely large amounts of memory are required, such as when data in the range of several TB must be loaded into memory at one time, the cost to purchase or provision computer systems having sufficient amounts of RAM storage may be prohibitive. For example, a supercomputer offering on the order of 5-10 TB of RAM storage may cost on the order of millions or tens of millions of dollars, and renting access to distributed cloud computing systems offering on the order of 5-10 TB of RAM may cost on the order of hundreds or thousands of dollars per hour. Given this cost prohibitiveness, users without vast amounts of monetary resources may be unable to implement computer applications requiring very large amounts of memory (e.g., memory requirements on the order of 5-10 TB or more).

Other known solutions for providing required amounts of memory is to utilize virtual memory solutions and/or caching solutions to temporarily move certain data off of RAM storage and onto non-volatile storage in order to free up more of the RAM storage for use by an application (e.g., for use by an application requiring very large amounts of memory). However, virtual memory solutions remain limited by (a) the amount of slot space onto which data may be temporarily moved from RAM, and (b) the total amount of RAM storage available on a device to be allocated as memory, even assuming all RAM storage is available. Thus, particularly for applications requiring very large data structures to be loaded into memory at once, virtual memory may still be an inadequate solution, and a user may still be unable to implement such an application without purchasing or provisioning extremely large amounts of RAM storage.

Accordingly, there is a need for systems, methods, and techniques of providing computer memory without the need for access to extremely large amounts of RAM storage.

SUMMARY OF THE INVENTION

As described above, there is a need for systems and techniques of providing computer memory without the need for access to extremely large amounts of RAM storage. Particularly, there is a need for providing large amounts of computer memory that allow loading very large data structures into memory at one time, and for doing so without requiring access to extremely large amounts of RAM storage.

In order to address this need, computer systems and program code may be configured such that memory for use in executing program code may be allocated on computer data storage mediums other than RAM storage mediums. For example, space may be allocated on a solid state drive for use as computer memory in executing program code. By leveraging program code and library files of common programming languages, users may be enabled to use solid state drives or other non-RAM storage mediums as computer memory, providing a user with access to vastly greater computer memory resources than he may otherwise be able to afford. While performance of a program executing using a solid state drive for memory may be one or more orders of magnitude slower than when executed using traditional modern RAM storage, the cost of allocating the same amount of memory space may be several orders of magnitude lower, or the amount of memory space that can be allocated for the same cost may be several orders of magnitude higher.

Described herein are methods, systems, and techniques for providing computer memory by allocating memory on computer storage mediums other than RAM storage, such as on non-volatile storage.

In some embodiments, a computer system comprises: one or more processors; a RAM storage medium; a non-volatile storage medium; and one or more programs, wherein the one or more programs are stored in the non-volatile storage medium and configured to be executed by the one or more processors, the one or more programs including instructions for: receiving program code including a first memory allocation function for allocating memory in the RAM storage medium; replacing the first memory allocation function with a second memory allocation function for allocating memory in the non-volatile storage medium; and executing the program code including the second memory allocation to allocate memory in the non-volatile storage medium.

In some embodiments, a method is performed at a system comprising one or more processors, a RAM storage medium, and a non-volatile storage medium, the method comprising: receiving program code including a first memory allocation function for allocating memory in the RAM storage medium; replacing the first memory allocation function with a second memory allocation function for allocating memory in the non-volatile storage medium; and executing the program code including the second memory allocation to allocate memory in the non-volatile storage medium.

In some embodiments, a non-transitory computer-readable storage medium stores one or more programs configured to be executed by one or more processors of a device with a RAM storage medium and a non-volatile storage medium, the one or more programs including instructions for: receiving program code including a first memory allocation function for allocating memory in the RAM storage medium; replacing the first memory allocation function with a second memory allocation function for allocating memory in the non-volatile storage medium; and executing the program code including the second memory allocation to allocate memory in the non-volatile storage medium.

In some embodiments, a computer system comprises: one or more processors; a RAM storage medium; a non-volatile storage medium; and one or more programs, wherein the one or more programs are stored in the non-volatile storage medium and configured to be executed by the one or more processors, the one or more programs including instructions for: receiving a first request to store data in memory in the RAM storage medium; in response to receiving the first request, storing the data in the non-volatile storage medium, receiving a second request to retrieve stored data from memory in the RAM storage medium; and in response to receiving the second request, retrieving the stored data from memory in the non-volatile storage medium.

In some embodiments, a method is performed at a system comprising one or more processors, a RAM storage medium, and a non-volatile storage medium, the method comprising: receiving a first request to store data in memory in the RAM storage medium; in response to receiving the first request, storing the data in the non-volatile storage medium, receiving a second request to retrieve stored data from memory in the RAM storage medium; and in response to receiving the second request, retrieving the stored data from memory in the non-volatile storage medium.

In some embodiments, a non-transitory computer-readable storage medium stores one or more programs configured to be executed by one or more processors of a device with a RAM storage medium and a non-volatile storage medium, the one or more programs including instructions for: receiving a first request to store data in memory in the RAM storage medium; in response to receiving the first request, storing the data in the non-volatile storage medium, receiving a second request to retrieve stored data from memory in the RAM storage medium; and in response to receiving the second request, retrieving the stored data from memory in the non-volatile storage medium.

In some embodiments, a computer system comprises: one or more processors; a RAM storage medium; a non-volatile storage medium; a library of a programming language, the library stored on the non-volatile storage medium, wherein the library includes a first library file associated with a first memory allocation function, and wherein the first library file includes instructions for allocating memory on the RAM storage medium; and one or more programs, wherein the one or more programs are stored in the non-volatile storage medium and configured to be executed by the one or more processors, the one or more programs including instructions for: storing a second library file in the library, wherein the second library file is associated with a second memory allocation function, and wherein the second library file includes instructions for allocating memory in the non-volatile storage medium; storing program code on the non-volatile storage medium, the program code including the second memory allocation function; and executing the program code including the second memory allocation to allocate memory in the non-volatile storage medium.

In some embodiments, a method is performed at a system comprising one or more processors, a RAM storage medium, a non-volatile storage medium, and a library of a programming language, wherein the library includes a first library file associated with a first memory allocation function, and wherein the first library file includes instructions for allocating memory on the RAM storage medium, the method comprising: storing a second library file in the library, wherein the second library file is associated with a second memory allocation function, and wherein the second library file includes instructions for allocating memory in the non-volatile storage medium; storing program code, the program code including the second memory allocation function; and executing the program code including the second memory allocation to allocate memory in the non-volatile storage medium.

In some embodiments, a non-transitory computer-readable storage medium stores one or more programs configured to be executed by one or more processors of a device with a RAM storage medium, a non-volatile storage medium, and a library of a programming language, wherein the library includes a first library file associated with a first memory allocation function, and wherein the first library file includes instructions for allocating memory on the RAM storage medium, the one or more programs including instructions for: storing a second library file in the library, wherein the second library file is associated with a second memory allocation function, and wherein the second library file includes instructions for allocating memory in the non-volatile storage medium; storing program code, the program code including the second memory allocation function; and executing the program code including the second memory allocation to allocate memory in the non-volatile storage medium.

In some embodiments, a computer system comprises: one or more processors; a RAM storage medium; a non-volatile storage medium; a library of a programming language, the library stored on the non-volatile storage medium, wherein the library includes a library file associated with a memory allocation function, wherein the library file includes instructions for allocating memory on the RAM storage medium; and one or more programs, wherein the one or more programs are stored in the non-volatile storage medium and configured to be executed by the one or more processors, the one or more programs including instructions for: modifying the library file to replace the instructions for allocating memory on the RAM storage medium with instructions for allocating memory in the non-volatile storage medium; storing program code on the non-volatile storage medium, the program code including the memory allocation function; and executing the program code including the memory allocation to allocate memory in the non-volatile storage medium.

In some embodiments, a method is performed at a system comprising one or more processors, a RAM storage medium, a non-volatile storage medium, and a library of a programming language, wherein the library includes a library file associated with a memory allocation function, and wherein the library file includes instructions for allocating memory on the RAM storage medium, the method comprising: modifying the library file to replace the instructions for allocating memory on the RAM storage medium with instructions for allocating memory in the non-volatile storage medium; storing program code on the non-volatile storage medium, the program code including the memory allocation function; and executing the program code including the memory allocation to allocate memory in the non-volatile storage medium.

In some embodiments, a non-transitory computer-readable storage medium stores one or more programs configured to be executed by one or more processors of a device with a RAM storage medium, a non-volatile storage medium, and a library of a programming language, wherein the library includes a library file associated with a memory allocation function, and wherein the library file includes instructions for allocating memory on the RAM storage medium, the one or more programs including instructions for: modifying the library file to replace the instructions for allocating memory on the RAM storage medium with instructions for allocating memory in the non-volatile storage medium; storing program code on the non-volatile storage medium, the program code including the memory allocation function; and executing the program code including the memory allocation to allocate memory in the non-volatile storage medium.

DETAILED DESCRIPTION OF THE INVENTION

Figure 1:
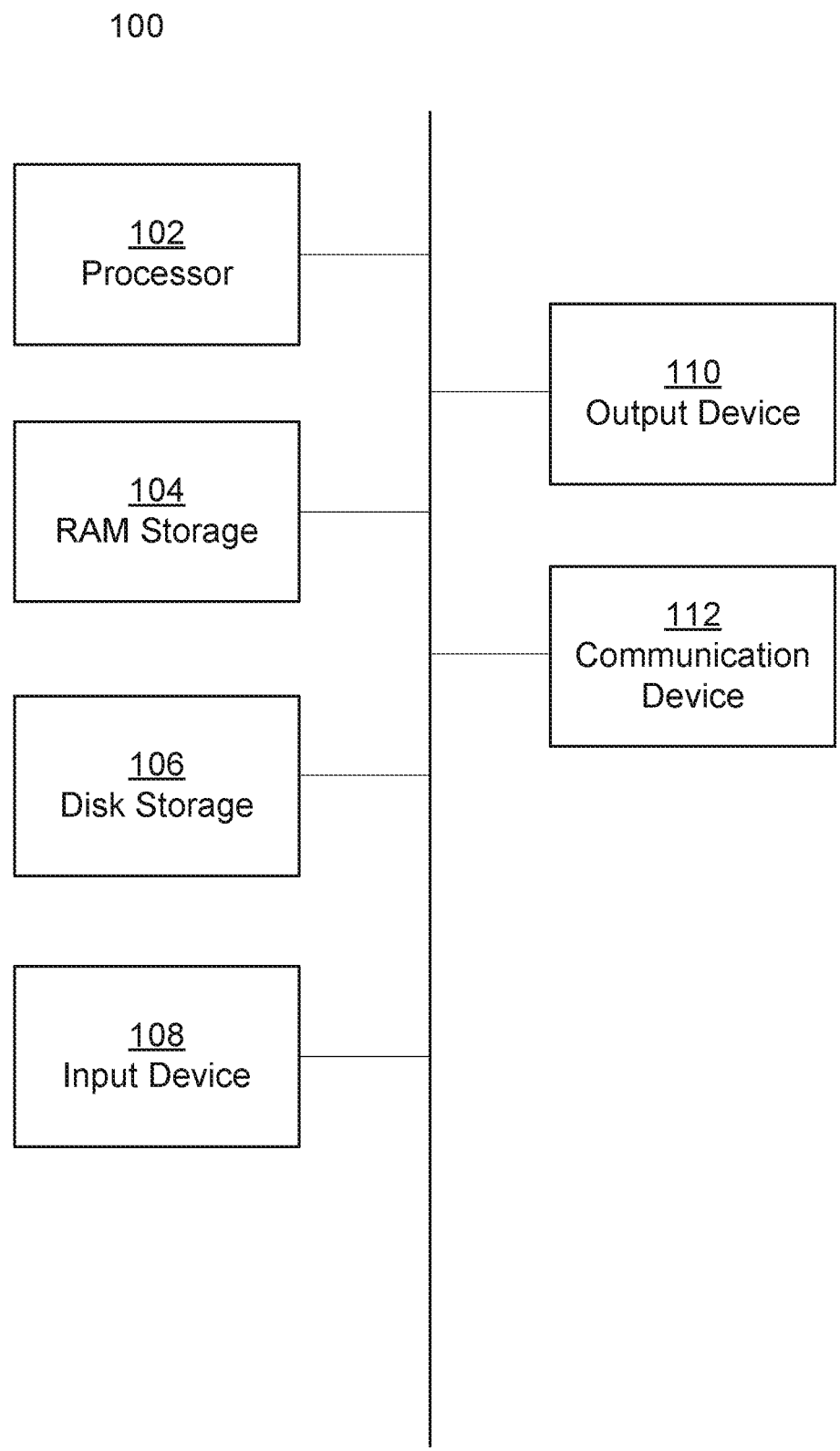
FIG. 1 is an illustration of a computer system according to certain embodiments.

As described above, there is a need for systems and techniques of providing computer memory without the need for access to extremely large amounts of RAM storage. Particularly, there is a need for providing large amounts of computer memory that allow loading very large data structures into memory at one time, and for doing so without requiring access to extremely large amounts of RAM storage.

One solution to this need to configure computer systems and program code in order to allow for the allocation of memory on computer data storage mediums other than RAM storage. For example, space may be allocated on a solid state drive for use as computer memory in executing program code.

The cost savings facilitated by these techniques, or the increase in the amount of accessible and usable memory space, may be significant. For example, as described above, a supercomputer offering on the order of 5-10 TB of RAM storage may cost on the order of millions or tens of millions of dollars, and renting access to distributed cloud computing systems offering on the order of 5-10 TB of RAM may cost on the order of hundreds or thousands of dollars per hour. However, a computer system offering on the order of 5-10 TB of SSD storage may only cost on the order of thousands or tens of thousands of dollars. Thus, significant expenses may be avoided, and millions of users without access to cost-prohibitive supercomputers may be able to implement computer programs calling for memory on the order of 5-10 TB that would otherwise be inaccessible to them.

One drawback of allocating memory on non-volatile storage (rather than on RAM) is that the read/write speeds and bus speeds of non-volatile storage may be substantially slower than the corresponding speeds for RAM. Programs executed using non-volatile storage as memory may accordingly be executed at slower speeds, running one or more orders of magnitude slower than if they were run on RAM. However, a performance drawback such as this may be acceptable in some embodiments when speed of execution is not critical and/or when allocating the required amount of memory (e.g., several TB of memory) in RAM is not feasible, affordable, or possible given hardware options available in a system. Furthermore, given the advent of modern solid state drives, this performance drawback may be significantly mitigated. Because modern solid state drives are not limited by the rate of a spinning disk and have dedicated controllers that speed up read/write times, overall read/write times or modern solid state drives may be within about one order of magnitude of the speed of modern RAM storage (rather than about two orders of magnitude slower, as spinning disk drives might be). Thus, because of the improvements in read/write times for solid state drives, the solutions disclosed herein of allocating memory on non-volatile storage becomes even more beneficial.

Accordingly, described herein are methods, systems, and techniques for providing computer memory by allocating memory on computer storage mediums other than RAM storage, such as on non-volatile storage.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Memory Allocation Systems

A system for allocating memory for the execution of computer programs is described below. The system may include a processor configured to receive, read, modify, compile, and execute computer-readable code. More specifically, the processor may be configured to modify program code to replace one or more memory-allocation functions in the code with modified memory allocation functions, where the modified memory allocation functions cause the system to treat as RAM other computer storage that may not traditionally be used as RAM. For example, modified memory allocation functions may cause the system, upon execution of the function, to allocate space on non-volatile storage (e.g., hard disk storage or solid state storage) to be used as memory, as opposed to allocating space on traditional dedicated RAM to be used as memory.

An example of a computer system for allocating memory according to some embodiments is illustrated by system 100 in FIG. 1. As shown in FIG. 1, system 100 can be any suitable type of microprocessor-based device, such as a personal computer, workstation, server, handheld computing device such as a phone or tablet, or distributed computing system (e.g., cloud computing system). The system can include, for example, one or more of processor 102, RAM storage 104, non-volatile storage 106, RAM storage 108, input device 110, output device 112, and communication device 114. The components of the computer can be connected in any suitable manner, such as via one or more physical buses or wirelessly.

Processor 102 may be any suitable type of computer processor capable of communicating with the other components of system 100 in order to execute computer-readable instructions and to cause system 100 to carry out actions in accordance with the instructions. For example, processor 100 may access a computer program that may be stored on non-volatile storage 106 and execute the program to cause the system to perform various actions in accordance with the program. In some embodiments, a computer program or other instructions executed by processor 102 may be stored on any transitory or non-transitory computer-readable storage medium readable by processor 102.

RAM storage 104 may be any random-access memory device configured to provide computer data storage, such that data stored to the RAM storage may be accessed, read, and/or written in substantially the same amount of time, irrespective of the physical location at which the data is stored on the RAM storage 104. In some embodiments, RAM storage 104 may be configured to provide volatile memory for computing operations. In some embodiments, RAM storage may be volatile storage, such that power is required to maintain the stored information. In some embodiments, RAM storage 104 may be any computer data storage medium other than non-volatile storage, or may be any computer data storage medium other than a computer data storage medium configured for non-transient or long-term data storage. In some embodiments, RAM storage 104 may communicate with other components of system 100 by a dedicated bus. In some embodiments, RAM storage 104 may communicate with other components of system 100 via one or more network connections.

Non-volatile storage 106 may be any computer storage device, such as an electrical, magnetic, and/or optical storage, including a hard drive, solid state drive, spinning disk drive, CD-ROM drive, tape drive, and/or or removable storage disk. Non-volatile storage 106 may not require power to maintain the stored information, and may be used for non-transient or long-term data storage. In some embodiments, non-volatile storage 106 may be any computer data storage medium other than volatile RAM storage. Non-volatile storage 106 may provide computer data storage such that data stored to non-volatile storage 106 may require substantially different amounts of time to be accessed, read, and/or written depending on the physical location at which the data is stored in the non-volatile storage 106. In some embodiments, non-volatile storage 106 may be configured to provide non-volatile memory in computing operations. In some embodiments, non-volatile storage 106 may communicate with the other components of system 100 by a dedicated bus that is separate and distinct from the bus used by RAM storage 104. In some embodiments, non-volatile storage 104 may communicate with other components of system 100 via one or more network connections, which may be one and the same or may be distinct from one or more network connections used by RAM storage 104.

In some embodiments, RAM storage 104 may be capable of providing significantly faster read and/or write times than non-volatile storage 106. For example, in some embodiments, data may be written to and read from RAM storage 104 one order of magnitude, two orders of magnitude, or three or more orders of magnitude faster than it may be written to and read from non-volatile storage 106. In some embodiments, RAM storage 104 and non-volatile storage 106 may offer comparable read/write rates (e.g., rates within about one order of magnitude of one another), such as in cases when RAM storage 104 is an older dedicated RAM device and when non-volatile storage 106 is a modern solid-state drive capable of substantially faster read/write rates than spinning disk hard disks. However, in many embodiments in which system 100 is a consumer-grade computing device, enterprise-grade computing device, or high-performance super-computer, read/write times for RAM storage 104 will be significantly faster than read/write times for non-volatile storage 106, as discussed above. Even in some embodiments in which non-volatile storage 106 is capable of read/write times that are substantially identical regardless of the physical location of the data within non-volatile storage 106, the read/write times for non-volatile storage 106 may nevertheless be substantially faster (e.g., by one or more orders of magnitude) than read/write speeds for RAM storage 104.

In some embodiments, faster read/write times for RAM storage 104 as compared to non-volatile storage 106 may be at least partially attributable to RAM storage 104 having a faster bus connection to processor 102 and/or other components of system 100, such that information transmitted between RAM storage 104 and processor 102 may reach its destination faster than information transmitted between non-volatile storage 106 and processor 102. In some embodiments, RAM storage 104 may be separated from processor 102 and/or other elements of system 100 by fewer intermediary communicative steps, as compared to the connection between non-volatile storage 106 and processor 102 and/or other elements of system 100. In some embodiments, reading and/or writing to non-volatile storage 106 may require substantially more voltage (e.g., about one or more orders of magnitude more voltage) as reading and/or writing the same amount of data to RAM storage 104.

Input device 108 can be any suitable device that provides input, such as a touch screen or monitor, keyboard, mouse, or voice-recognition device. Output device 110 can be any suitable device that provides output, such as a touch screen, monitor, printer, disk drive, or speaker.

Communication device 112 can include any suitable device capable of transmitting and receiving signals over a network, such as a network interface chip or card.

In some embodiments, software may be stored on non-volatile storage 106 and may be executed by processor 102. In some embodiments, executing software stored on non-volatile storage 106 may include leveraging ram storage 104 in the execution of such software. As explained herein, the techniques of the present disclosure may further be implemented in order to allocate and utilize non-volatile storage 106 as memory for the execution of software stored on non-volatile storage 106. In some embodiments, the software stored on non-volatile storage 106, can include, for example, the programming that embodies the functionality of the present disclosure (e.g., as embodied in the computers, servers and devices as described herein).

The software may also be stored and/or transported within any computer-readable storage medium for use by or in connection with an instruction execution system, apparatus, or device, such as those described herein, that can fetch instructions associated with the software from the instruction execution system, apparatus, or device and execute the instructions. In the context of this disclosure, a computer-readable storage medium can be any medium, such as non-volatile storage 106, that can contain or store programming for use by or in connection with an instruction execution system, apparatus, or device.

The software can also be propagated within any transport medium for use by or in connection with an instruction execution system, apparatus, or device, such as those described herein, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

In some embodiments, system 100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 100 can implement any operating system suitable for operating on the network. Software stored on or implemented by system 100 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

In some embodiments, some or all components of system 100 may be part of a distributed computing system (e.g., a cloud computing system). In some embodiments of the techniques disclosed herein, for example, non-volatile storage 106 may be storage provisioned by a cloud computing system, such that a user may send instructions to the cloud computing system over one or more network connections, and the cloud computing system may execute the instructions in order to leverage the cloud computing components in accordance with the instructions, such as by allocating memory on non-volatile storage of a cloud computing system. In some embodiments, cloud computing systems may be configured to be capable of executing the same or similar program code in the same programming languages as other systems (e.g., personal computers, laptops, etc.) as discussed herein.

Modifying Program Code to Allocate Memory on Non-Volatile Storage

Figure 2A:
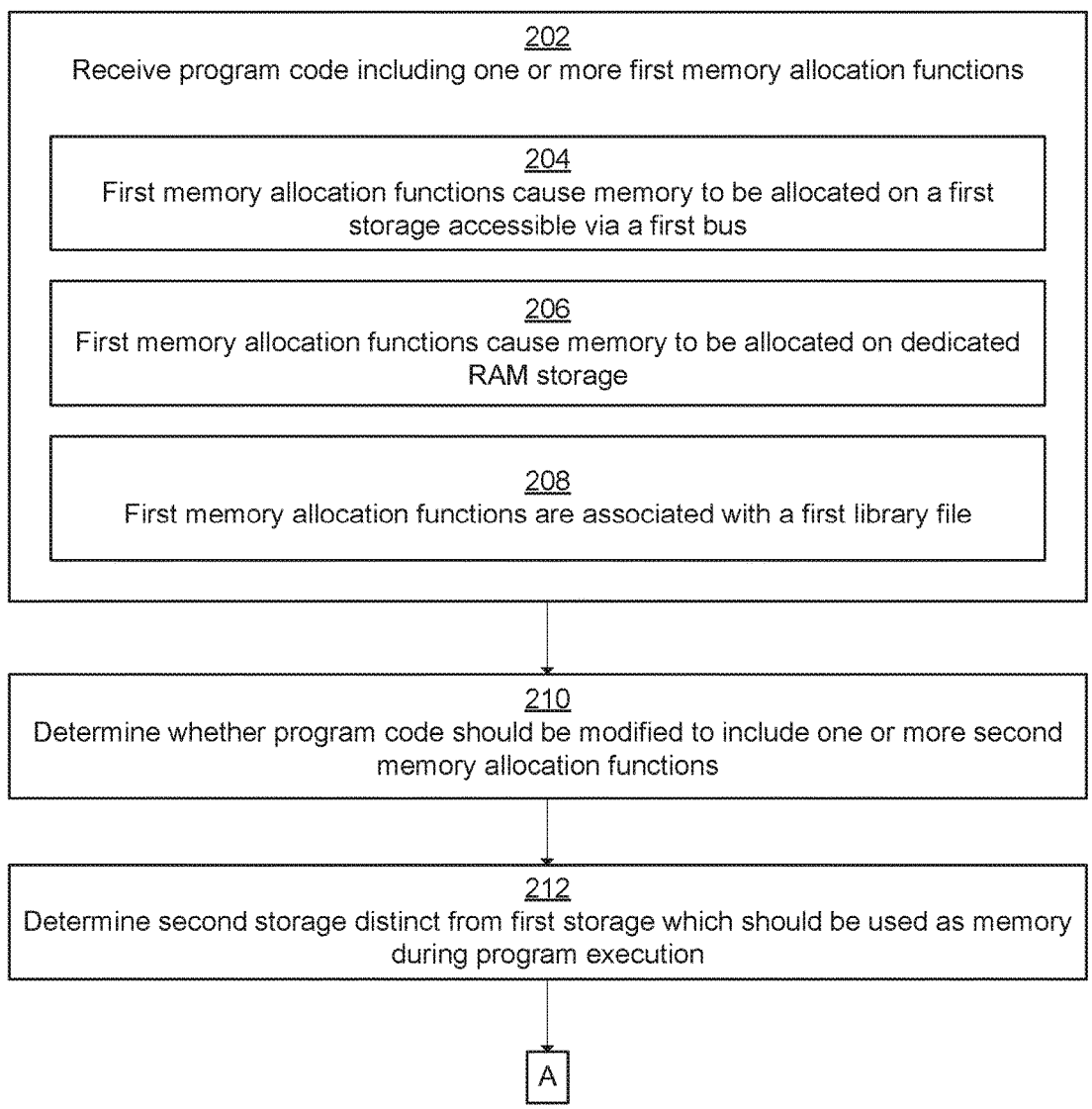
FIGS. 2A and 2B are a flow chart depicting a memory allocation method in accordance with some embodiments.
Figure 2B:
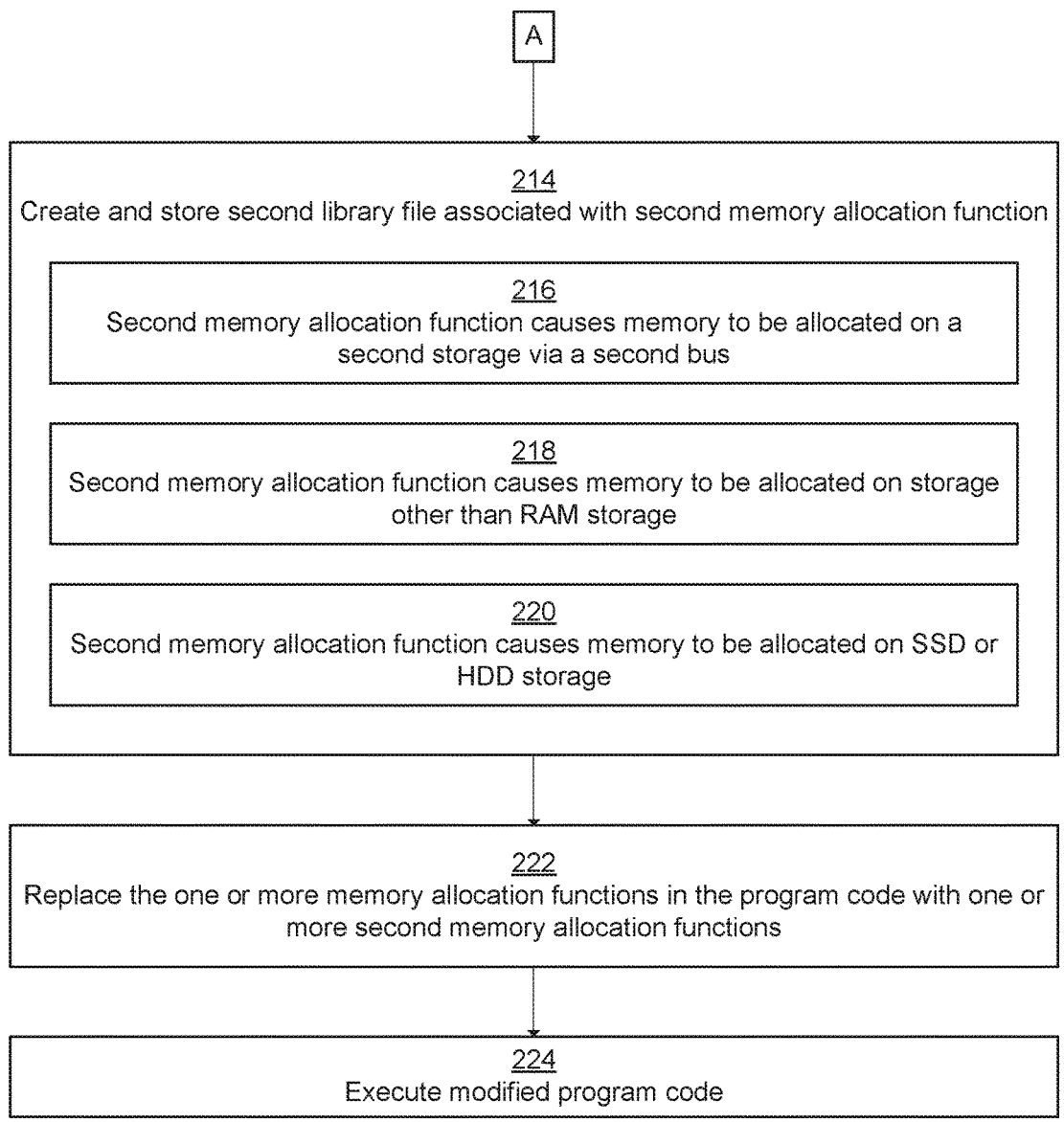

FIG. 2 depicts exemplary method 200 of memory allocation in accordance with some embodiments. The method depicted in FIG. 2 may be implemented by computer systems having RAM storage and non-volatile storage, such as system 100 in FIG. 1 described above. Method 200 may, in some embodiments, be combined in whole or in part with other techniques described herein.

At block 202, in some embodiments, the system may receive program code including one or more memory allocation functions. In some embodiments, the program code may be any computer-readable and/or computer-executable code including instructions for executing computer functions. The program code may be written in any one or more computer languages, including but not limited to C, C++, C#, CSS, Java, JavaScript, Python, Pearl, PHP, and/or Ruby. In some embodiments, the program code may be written in a higher-order programming language or an object-oriented programming language.

The received program code may be compiled or uncompiled at the time that it is received, and the received program code may be received by a system in any suitable manner of communication. For example, a computer system such as system 100 shown in FIG. 1 may receive program code via input device 108 (e.g., code typed or entered by a user) or may receive program code via communication device 112 (e.g., code received via network communication, such as downloaded from the internet). The program code may also be received by being provided to a computer system on a portable or removable storage medium, such as being uploaded to a computer system from a portable hard drive or USB drive, or from an optical or magnetic storage device.

The one or more memory allocation functions included in the received program code may be any command, instruction, or function operable to instruct a computer system to allocate memory for the execution of one or more computer commands. For example, the memory allocation functions may include a command to allocate space in a dedicated RAM drive as memory for executing portions of the program code itself. In the example of system 100, the one or more memory allocation functions may include an instruction for system 100 to allocate space in RAM storage 104 during the execution of the program code.

At block 204, in some embodiments, the memory allocation functions may cause memory to be allocated on a first storage accessible via a first bus. At block 206, in some embodiments, the memory allocation functions may cause memory to be allocated on dedicated RAM storage.

In one specific example, if the received program code is written the C programming language, then the memory allocation function may include:
- a "malloc" function, which instructs the allocation of a specified amount of memory in RAM storage;
- a "calloc" function, which instructs cleaning of and allocation of a specified amount of memory in RAM storage;
- a "realloc" function, which instructs the allocation of a different amount of memory in RAM storage (at the same or a different location in the RAM storage) than an amount of memory that is already allocated in the RAM storage;
- and/or a "free" function, which instructs freeing memory space once it no longer needs to be allocated.

In other languages, different memory allocation functions that allocate, clear, reallocate, and/or free memory for use by program code may be equally applicable to the techniques disclosed herein. In some embodiments, the memory allocation function may accept one or more inputs and may return one or more outputs. For example, a malloc function (or other memory allocation function) may require an input indicating the amount (e.g., data size) of memory that is requested to be allocated. A malloc function may further, for example, return as a result a pointer to a specific location in storage (e.g., in RAM storage), where the pointer indicates a location in storage that is at the beginning of a continuous block of available space in that is at least as large as the requested amount of memory requested to be allocated.

At block 208, in some embodiments, the first memory allocation function may be associated with a first library file. As used herein, the term library file may refer to any macro, type definition, function, set of one or more instructions or calls, or any other stored commands or other data stored as part of a library of a computer programming language. For example, instructions for performing memory allocation may be defined by or in association with a library file in a library of a computer programming language, such as a standard library of the programming language. In some embodiments, memory allocation functions such as the C-language memory allocation functions listed above may be defined by or in association with one or more library files. For example, the "malloc" function in C may be defined in association with a library file that includes instructions (e.g., calls) that are performed by the malloc function. For example, the "malloc" library file may define a specific bus by which a processor should communicate when executing the "malloc" function, wherein the specific bus is a bus that allows the processor to communicate with a dedicated RAM storage. In some embodiments, library files defining memory allocation functions may be created, deleted, renamed, and otherwise freely modified by a user. For example, in some embodiments, a user may be able to add, delete, replace, or otherwise modify one or more instructions or calls that are included in a library file that defines or is otherwise associated with a memory allocation function.

At block 210, in some embodiments, the system may determine whether the program code should be modified to include one or more modified memory allocation functions. In some embodiments, the determination as to whether program code should be modified to include modified memory allocation functions may include consulting a user instruction, such as a stored or received explicit user instruction, as to whether the code should be modified as such. In some embodiments, the determination as to whether the program code should be modified as such may include determining whether the system (or another system on which the code is to execute) has sufficient conventional RAM resources in order to be able to meet the needs of the program code. For example, a system and/or a user of the system may determine the amount of memory that is required to be allocated during execution of the code, and may determine whether the system itself (or another system on which the program code is to execute) has that amount of memory available in conventional RAM resources. In some embodiments, determining whether sufficient conventional RAM resources are available may include determining whether virtual memory techniques (e.g., leveraging swap space) may be used to make available sufficient memory space on conventional RAM resources.

In some embodiments, determining whether the program code should be modified may include determining whether or not certain specific data may suitably be stored on non-volatile storage during execution of the program code. For example, in some embodiments, a system or a user may determine that certain data should not be allocated to memory on non-volatile memory, as it may be critical to the operation of the system or the system's performance as a whole may be impeded if it is run using slower read/write speed storage as memory. Thus, a system may implement predefined rules or lists of data or data types that should not be allocated to memory on non-volatile storage, but should rather be allocated to memory on RAM storage. As one example, data relating to the stack or data relating to heap allocation may be designated as needing to remain on RAM storage, such that the system may determine that program code should not be rewritten to allocate space for such data on non-volatile storage.

In some embodiments, if the system determines that the program code should not be modified to include one or more second memory allocation functions (e.g., if the system determines that the program code may be successfully executed on conventional RAM resources available to the system), then the system may execute the program code (e.g., using conventional RAM resources of the system or of an associated system). Alternately, the system may take no further action on the program code, or may indicate to a user or store an indication that the program code need not be modified, or the system may transmit or store the unmodified program code.

In some embodiments, if the system determines that the program code should be modified to include one or more second memory allocation functions (e.g., if the system determines that the program code may not be successfully executed on conventional RAM resources available to the system), then the system may continue from block 210 to one or more of blocks 212 through 226.

At block 212, in some embodiments, the system may determine a second storage, distinct from the first storage, that should be used as memory for execution of the program code. In some embodiments, the determination of a second storage, distinct from the first storage, that should be used as memory for execution of the program code may include consulting a user instruction, such as a stored or received explicit user instruction, as to a second storage that should be used. In some embodiments, a user may explicitly designate a second storage that should be used by making reference to another storage, such as by a name of the other storage, by referencing a bus associated with the other storage, or by referencing a library file associated with the other storage. In some embodiments, the system may provide a user with a menu of one or more storage options from which to select, and a user may indicate which of the one or more storage options should be used for memory.

In some embodiments, the determination of the second storage may be made automatically by the system, in accordance with predefined rules, conditions, or selection algorithms. A system may, in some embodiments, make the determination as to which storage should be used for memory in accordance with an amount of memory space required, amounts of space available on one or more available storages, bus speeds associated with one or more available storages, read/write speeds associated with one or more available storages, and/or any other properties associated with reading from or writing to one or more available storages. In one simple example, a system may determine which available storages have sufficient available space to meet the memory requirements of the program code, and may then select the storage that has the overall highest read/write speeds. In another example, a system may select the storage that has the most available free space, so long as that storage meets a minimum predefined read/write speed.

At step 214, in some embodiments, the system may create and store a second memory allocation library file associated with a second memory allocation function. At block 216, in some embodiments, the second memory allocation function may cause memory to be allocated on the second storage (determined as described above with respect to block 212) via a second bus. At block 218, in some embodiments, the second memory allocation function may cause memory to be allocated on storage other than RAM storage. At block 220, in some embodiments, the second memory allocation function may cause memory to be allocated on solid state drive (SSD) or hard disk drive (HDD).

For example, the second storage, selected as described above with respect to block 212, may be a storage that is not a conventional RAM storage, but rather may instead be any electrical, magnetic, and/or optical storage, including a hard drive, solid state drive, spinning disk drive, CD-ROM drive, tape drive, and/or or removable storage disk. (In some embodiments, the techniques described herein may be similarly applicable to techniques in which the second storage is an alternative conventional RAM storage; however, this disclosure will discuss techniques in which the second storage is not a conventional storage.) In some embodiments, allocating memory on solid state storage may be preferable to allocating memory on hard disk storage, as solid state storage may have substantially faster read/write times than hard disk storage, and performance may therefore be superior when using solid state storage for memory. In the example of system 100 in FIG. 1, the second storage may be non-volatile storage 106 (whereas the first storage may be RAM storage 104).

The second library file (as described with reference to block 214) may be any library file in the manner described above with respect to the first library file at block 208. In some embodiments share one or more properties with the first library file, except that it may define the second memory allocation function rather than the first memory allocation function. For example, the second library file may include instructions or commands operable to cause the system to allocate memory on the second storage, rather than the first storage, for example by instructing that memory should be allocated over the second bus associated with the second storage rather than over the first bus associated with the first storage. In some embodiments, the second library file may include an "init" function that indicates a bus over which memory should be allocated, where the indicated bus is in communication with the second storage. In some embodiments, an "init" function indicating a data structure may be used to enable the system to store and recall a location of data in memory for subsequent retrieval. In some embodiments, this functionality of including an "init" function in a second library file may be augmented or replaced by modifying a compiler to enable creating and/or executing instructions to allocate memory in a storage other than a conventional RAM storage.

In the example in which the first memory allocation function is the "malloc" function in the C programming language, defined by a library file in the C standard library, then the second memory allocation function may be a newly-defined memory allocation function that is not associated with a standard library file in the C standard library. In some embodiments, the second function may be called "malloc_d" (where the "d" may indicate memory allocation on disk storage and/or on solid state drive storage). In order to configure a system such that it may compile and execute program code in which a "malloc_d" function is included, a new library file may be created and stored in the libraries for the C programming language on a system. (In other programming languages using other libraries, a new library file may similarly be added to the respective library.) The "malloc_d" library file, or more generally any second library file created and stored in accordance with block 214, may enable the system to allocate memory over a bus associated with non-volatile storage, rather than over a bus associated with conventional RAM storage.

Furthermore, in some embodiments, the "malloc_d" library file may define the "malloc_d" function to accept one or more inputs and to generate one or more outputs, similarly to the manner in which the "malloc" function accepts an input indicating the amount of memory required and returns an output pointer indicating a location in RAM storage where the required amount of memory is available. In some embodiments, the "malloc_d" function may also accept an input indicating the amount of memory required, and may similarly return an output pointer indicating a location in storage where the required amount of memory is available, where the output pointer indicates a location in non-volatile storage rather than in RAM storage. In some embodiments, the "malloc_d" function may accept one or more additional inputs relating to requirements for the amount, location, or nature of memory that is required to be allocated, and may generate one or more additional outputs in addition to the pointer indicating a location at which the memory is available. In some embodiments, the "malloc_d" function may accept, in addition to an input indicating an amount of memory that is required to be allocated, a second input that indicates serves to inform the "malloc_d" function of the presence and location of currently available storage in the relevant non-volatile storage. For example, the "malloc_d" function may, in some embodiments, require an input in the form of a hashmap that may be maintained and updated in order to keep track of available space on non-volatile storage such that non-volatile storage space may be allocated for memory without overwriting or conflicting with data persistently stored on the non-volatile storage, and without overwriting or conflicting with any other data stored in memory in non-volatile storage. In some embodiments, the hashmap may be used to keep track of where memory is allocated, and/or to keep track of overall usage by tracking the amount used for each allocation of memory. In some embodiments, the hashmap may use a pointer and a file name as a key-value pair. In some embodiments, the "malloc_d" function may accept any one or more further inputs that allow the function to determine where on the non-volatile storage there is available space of the requested amount.

In some examples in which the first memory allocation function is not a "malloc" function, then different second memory allocation functions may be used. The second memory allocation functions may, in some embodiments, function in as similar a manner as possible to the first memory allocation functions, except that they may be configured to allocate memory on the indicated second storage rather than on conventional RAM storage. For example, when the first memory allocation function is a "realloc" function in the C programming language, then the second memory allocation function (e.g., "realloc_d") may be defined to reallocate memory on non-volatile storage in an analogous manner as "realloc" reallocates memory on RAM storage. When the first memory function is a "calloc" function in the C programming language, then the second memory allocation function (e.g., "calloc_d") may be defined to clean and allocate memory on non-volatile storage in an analogous manner as "calloc" cleans and allocates memory on RAM storage. For other first memory allocation functions, including those written in other programming languages, corresponding second memory allocation functions may be provided. For any such second memory allocation function, further modifications over the corresponding first memory allocation function (e.g., accepting additional or fewer inputs, producing additional or fewer outputs) may be made.

In some embodiments, the second library file corresponding to the second memory allocation function may be created and/or stored before program code is received, read, or analyzed in any manner by the system. For example, the second library file (and in some embodiments further additional library files) may be pre-loaded onto the system in order to enable the system to implement the second memory allocation function (or further modified memory allocation functions) before the program code is received. Upon receiving the program code, the system or user may then simply determine whether and how to modify the program code to include the second memory allocation function, and may implement the second memory allocation function by utilizing the by-then-already created and stored second library file.

At block 222, in some embodiments, the system may replace the one or more first memory allocation functions in the program code with one or more second memory allocation functions. As described above, in some embodiments, the replacement may be carried out in accordance with the determination that the first memory allocation functions should be replaced. For example, in some embodiments, if it is determined that not enough memory is available in a conventional RAM storage to execute the program code, then the system may replace a first memory allocation function that allocated memory in the conventional RAM storage with a second memory allocation function that allocated memory in non-volatile storage. In some embodiments, the replacement may be made via a macro, via a define operation, via another automated technique, such that instances of the first memory allocation function may be automatically replaced by instances of the second memory allocation function. In some embodiments of automatic replacement in which a first memory allocation function is automatically replaced with a second memory allocation function, the automatic replacement may also provide any additional input needed by the second memory allocation function, such as an additional hashmap that needs to be provided to the second memory allocation function but not the first memory allocation function. In this way, implementing the techniques herein may be "transparent" to a user or to a programmer, who may be able to prepare or provide program code having traditional first memory allocation functions that will be automatically replaced by second memory allocation functions in accordance with the techniques herein.

In some embodiments, the system may automatically determine where space is available in non-volatile storage 106 to be used for memory allocation. In some embodiments, a programmatic determination of where space is available in non-volatile storage 106 may require several pieces of information to be included at run/compile time. One such piece of information may include a listing of available mediums and the storage available in each medium, which may be refreshed periodically before, during, and after execution to determine location and amount of remaining space, as multiple systems could be using the same non-volatile memory or other storage medium. Another such piece of information required for programmatic determination of where space is available in non-volatile storage 106 may be some indication of "choke points" in code, which may be manually flagged by a programmer or other user or may be automatically/algorithmically determined by the system. In some embodiments, a choke point may be a portion of code including memory allocation functions that should be executed using conventional RAM storage or other high-speed memory, rather than non-volatile storage, due to requirements for speed. Identification of choke points may be achieved using programs or other coding flags, and flags or other indications may signal varying tolerances or priority for placing certain types or kinds of data in allocated memory on non-volatile storage mediums.

In the example of system 100 in FIG. 1, a first memory allocation function that allocates memory in RAM storage 104 may be replaced with a second memory allocation function that allocates memory in non-volatile storage. In the example discussed above in which the program code is provided in the C programming language, a conventional "malloc" memory allocation function may be replaced with a "malloc_d" memory-on-non-volatile-storage allocation function as discussed above. The replacement may occur, in some embodiments, before, after, or during code compiling.

At block 224, in some embodiments, the system may execute the modified program code. Executing the modified program code including the second memory allocation functions may, in some embodiments, cause the system to allocate space on the second storage for use as memory. In the example of system 100 in FIG. 1, space on non-volatile storage 106, rather than RAM storage 104, may be allocated for use as memory. In some embodiments, allocating storage space on RAM storage 104 and/or on non-volatile storage 106 may include or cause storing data indicating that the space has been allocated, sending requests or instructions to store data on the allocated space, and/or sending requests or instructions to retrieve stored data from the allocated space.

Creating Program Code to Allocate Memory on Non-Volatile Storage

In some embodiments, techniques disclosed herein may be utilized to allocate memory on non-volatile storage (rather than on conventional RAM storage) without modifying pre-existing program code that may have otherwise (e.g., without modification) allocated memory on conventional RAM storage. For example, in some embodiments, a system or a user of a system (such as system 100 in FIG. 1) may create (e.g., write, store, etc.) new program code that includes memory allocation functions that allocate memory on non-volatile storage, such as the second memory allocation functions discussed above with respect to FIGS. 2A and 2B.

Figure 3:
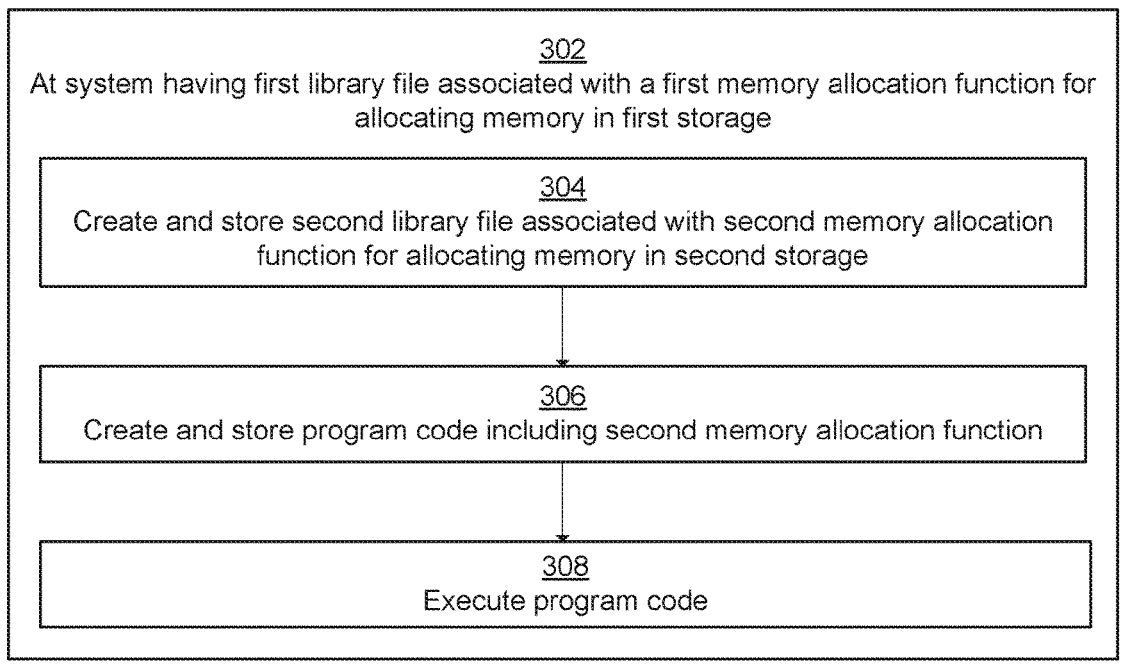
FIG. 3 is a flow chart depicting a memory allocation method in accordance with some embodiments.

FIG. 3 depicts exemplary method 300 of memory allocation in accordance with some embodiments. The method depicted in FIG. 3 may be implemented by computer systems having RAM storage and non-volatile storage, such as system 100 in FIG. 1 described above. Method 300 may, in some embodiments, be combined in whole or in part with other techniques described herein.

At block 302, in some embodiments, method 300 may be performed at a system having first library file associated with a first memory allocation function for allocating memory in first storage. In some embodiments, the system may be system 100 in FIG. 1. In some embodiments, the system, first library file, first memory allocation function, and/or first storage may share some or all characteristics with the systems, files, functions, and storages discussed above with respect to FIGS. 2A and 2B. For example, as discussed above, the first storage may be a RAM storage such as RAM storage 104, and the first memory allocation function may be associated with the first library file, which may be stored in a library of a programming language and may include instructions for allocating memory on the RAM storage. For example, the first memory allocation function may be a "malloc" function as discussed above.

At block 304, in some embodiments, the system may create and store a second library file associated with a second memory allocation function for allocating memory in a second storage. In some embodiments, the second library file, second memory allocation function, and/or second storage may share some or all characteristics with the files, functions, and storages discussed above with respect to FIGS. 2A and 2B. For example, as discussed above, the second storage may be a non-volatile storage such as non-volatile storage 106, and the second memory allocation function may be associated with the second library file, which may be created and stored in the library of a programming language and may include instructions for allocating memory on the non-volatile storage. In some embodiments, a user or a system may create and store a library file (as discussed above with reference to the second library file in FIGS. 2A and 2B) that enables code compiled and/or executed on the system to allocate memory in non-volatile storage. The library file may be stored in a library of a programming language, and may be similar or analogous to a standard library file in the library that is configured to enable allocating memory on convention RAM storage, as discussed above with reference to FIGS. 2A and 2B. For example, the second memory allocation function may be a "malloc_d" function as discussed above, and the second library file may be an associated library file, defining "malloc_d", that is created and stored in a library of the C programming language.

At block 306, in some embodiments, the system may create and store program code including the second memory allocation function. For example, a user or a system may write and store code configured to allocate memory in non-volatile storage. In some embodiments, the code may be manually written by a user, or it may be partially or fully automatically generated by the system. In some embodiments, the code may be partially received and partially created from scratch by the system. In some embodiments, the code may be received by the system rather than being created by the system. In some embodiments, the program code may be stored on non-volatile storage of the system, such as on non-volatile storage 106.

At block 308, in some embodiments, the system may execute the program code. For example, once a user or a system creates and stores the second library file for allocating memory on non-volatile storage, then program code including the second function (associated with the second library file) may be written, stored, compiled, and/or executed on the system, where the program code causes memory to be allocated on non-volatile storage in accordance with the program code. The system may then execute the program code in order to effectuate allocation of memory on the non-volatile storage.

In this way, it is possible in some embodiments that a user or system may create (e.g., write and store) program code for allocating memory on non-volatile storage from scratch, in addition to being able to modify existing program code to replace traditional memory-on-RAM allocation functions with memory-on-non-volatile-storage allocation functions (as discussed above with reference to FIGS. 2A and 2B).

Modifying Existing Library File to Allocate Memory on Non-Volatile Storage

In the embodiments described above with respect to FIG. 3 and method 300, a new library file may be created that enables allocation of memory on non-volatile storage. That library file may be stored alongside (e.g., in addition to) a preexisting and/or standard library file that allows allocation of memory on RAM storage. Thus, a user may be able to select from among different memory allocation functions respectively associated with each of the library files, in order to be able to choose when to allocate memory on RAM storage and when to allocate memory on non-volatile storage.

However, in some embodiments, creation of a new library file and function for allocating memory on non-volatile storage that are separate from the library file and function for allocating memory on RAM storage may mean that a user or system may be required to modify code in order for the code to allocate memory on non-volatile storage. For example, in a scenario where a user downloads code in the C programming language and the code contains "malloc" functions, but the user wants to allocate memory on non-volatile storage rather than on RAM storage, then the user of method 300 may need change the code to contain "malloc_d" functions rather than "malloc" functions. While this may be achieved, in some embodiments, using a macro to find and replace instances of "malloc" in the code with "malloc_d", a user may in some embodiments desire to avoid this code modification step.

In some such instances, instead of modifying the program code itself to contain a second memory allocation function different from a first memory allocation function, a user may instead modify the library file associated with the first function in order to change the way that the first function operates. For example, a user may modify a library file that allocates memory on RAM storage in order to replace instructions in the library file for allocating memory on RAM storage with instructions for allocating memory on non-volatile storage. An exemplary method for doing so is explained below with reference to FIG. 4.

Figure 4:
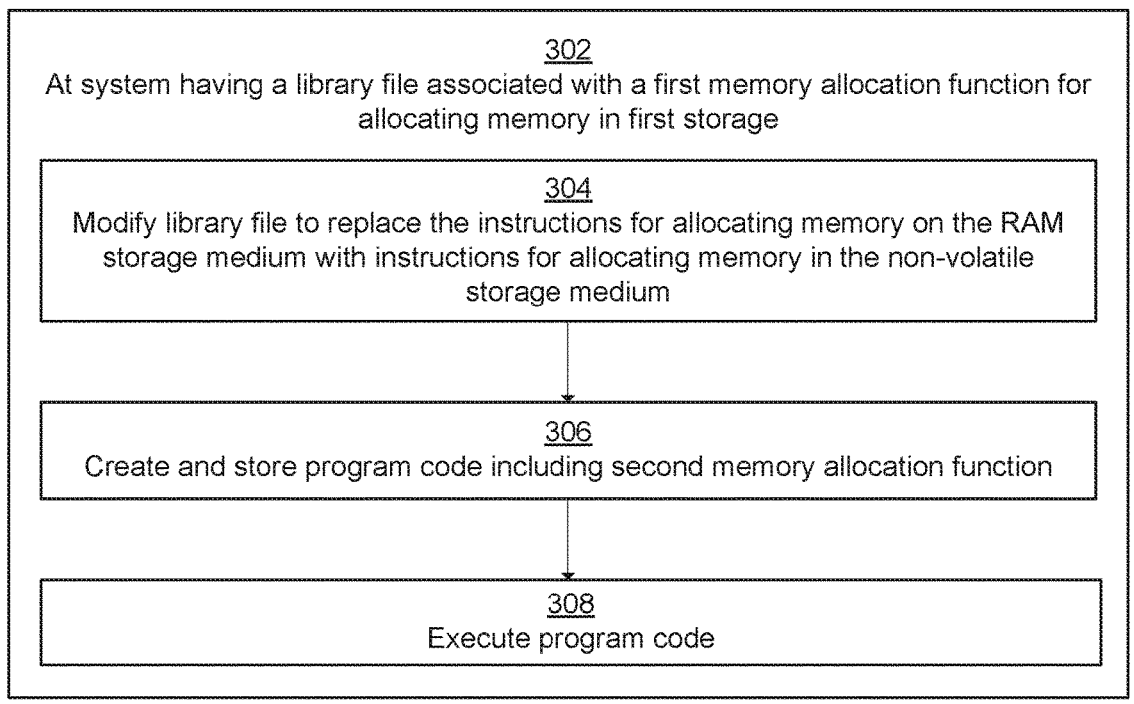
FIG. 4 is a flow chart depicting a memory allocation method in accordance with some embodiments.

FIG. 4 depicts exemplary method 400 of memory allocation in accordance with some embodiments. The method depicted in FIG. 4 may be implemented by computer systems having RAM storage and non-volatile storage, such as system 100 in FIG. 1 described above. Method 400 may, in some embodiments, be combined in whole or in part with other techniques described herein.

At block 402, in some embodiments, method 400 may be performed at a system having library file associated with a memory allocation function for allocating memory in first storage. In some embodiments, the system may be system 100 in FIG. 1. In some embodiments, the system, library file, memory allocation function, and/or first storage may share some or all characteristics with the systems, files, functions, and storages discussed above with respect to FIGS. 2A and 2B. For example, as discussed above, the first storage may be a RAM storage such as RAM storage 104, and the memory allocation function may be associated with the library file, which may be stored in a library of a programming language and may include instructions for allocating memory on the RAM storage. For example, the memory allocation function may be a "malloc" function as discussed above.

At block 404, in some embodiments, the system may modify the library file to replace instructions for allocating memory on the first storage medium with instructions for allocating memory on second storage medium. For example, the modification may replace instructions in the library file that enable allocating memory on RAM storage (such as RAM storage 104) with instructions that enable allocating memory on non-volatile storage (such as non-volatile storage 106). For example, the modification may change a bus to which the library file makes reference (e.g., to point to a non-volatile-storage-associated bus rather than a RAM-storage-associated bus), may modify an identifier of a storage medium included in the library file, may modify a pointer located in the library file, and/or may modify a map or table or bookkeeping structure stored in the library file. In one example, a user may modify a "malloc" library file in the C standard library to transform it into a "malloc_d" library file as discussed above.

In some embodiments, modifying the library file may include leaving the function name by which the library file is referenced the same. For example, if a library file is originally configured to be referenced by the string "malloc" written in program code, then the modification may preserve this characteristic, such that the library file may effectuate a different effect, but may be called by the same string.

In some embodiments, the modified library file may define a function that may accept the same number and type of inputs and outputs as the unmodified library file and unmodified function, such that program code containing the first function may be compiled and executed in accordance with the second library file without modification of the program code itself.

At block 406, in some embodiments, the system may create and store program code including the memory allocation function. For example, a user or a system may write and store code configured to allocate memory in non-volatile storage. In some embodiments, the code may be manually written by a user, or it may be partially or fully automatically generated by the system. In some embodiments, the code may be partially received and partially created from scratch by the system. In some embodiments, the code may be received by the system rather than being created by the system. In some embodiments, the program code may be stored on non-volatile storage of the system, such as on non-volatile storage 106.

At block 408, in some embodiments, the system may execute the program code. For example, once a user or a system modifies the library file in order to configure it to enable allocating memory on non-volatile storage, then program code including the associated memory-allocation function (associated with the library file) may be written, stored, compiled, and/or executed on the system, where the program code causes memory to be allocated on non-volatile storage in accordance with the program code. The system may then execute the program code in order to effectuate allocation of memory on the non-volatile storage.

In this way, it is possible in some embodiments that a user or system may create (e.g., write and store) program code and a library file for allocating memory on non-volatile storage, such that few or no modifications may be required to be made to program code itself originally written to allocate memory on RAM storage in accordance with a standard library of a computer programming language. Instead, by modifying a library file of the computer programming language library, the original program code may be compiled and executed with few or no modifications, in accordance with the modified library file, in order to cause allocation of memory on non-volatile storage rather than on RAM storage.

In some embodiments, any or all of the techniques described herein may be implemented in any suitable computer programming language. Some examples discussed herein have made reference to the C programming language, though other programming languages may be suitable for implementing the techniques disclosed herein. In some embodiments of using a higher-order programming language to implement the techniques disclosed herein to allocate memory on non-volatile storage, a virtual machine associated with the higher-order programming language (e.g., the Java Virtual Machine for a system running Java) may be modified by a user or a system in order to replace, modify, or augment its memory allocation functions to cause them to point to a bus associated with a non-volatile storage for memory allocation.

Modifying an Operating System to Allocate Memory on Non-Volatile Storage

In some embodiments, memory may be allocated on non-volatile storage by modifying an operating system to enable the allocation. In some such embodiments, rather than augmenting or modifying a programming language library or programming code as discussed elsewhere herein, an operating system kernel may be modified such that memory allocation calls are directed to a bus that is not associated with conventional RAM storage, but is rather associated with non-volatile storage. In these embodiments, unmodified program code may be run on a system having the modified-kernel operating system, and the code may then simply treat a non-RAM-storage bus as if it were a RAM-storage bus, causing all memory allocation to be performed over the non-RAM bus on the non-volatile storage accessible by the non-RAM bus.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The techniques, methods, systems, devices, and/or other aspects disclosed herein may, in some embodiments, include one or more of the following enumerated embodiments, in whole or in part. As would be apparent to a person of skill in the art in light of the disclosures herein, the following enumerated embodiments may optionally be combined in any suitable combination, including by incorporating one or more elements of any of the dependent embodiments below with any of the independent embodiments (even if such dependency is not explicitly indicated below). Features from the independent enumerated embodiments below may also be combined with one another.

1. A computer system comprising:
   one or more processors;
   a RAM storage medium;
   a non-volatile storage medium; and
   one or more programs, wherein the one or more programs are stored in the non-volatile storage medium and configured to be executed by the one or more processors, the one or more programs including instructions for:
   receiving program code including a first memory allocation function for allocating memory in the RAM storage medium;
   replacing the first memory allocation function with a second memory allocation function for allocating memory in the non-volatile storage medium; and
   executing the program code including the second memory allocation to allocate memory in the non-volatile storage medium.

2. The system of embodiment 1, wherein:
   the RAM storage medium communicates with the one or more processors via a first bus, and the first memory allocation function causes the system to allocate memory over the first bus; and
   the non-volatile storage medium communicates with the one or more processors via a second bus, and the second memory allocation function causes the system to allocate memory over the second bus.

3. The system of embodiment 1, wherein the RAM storage medium is a volatile storage medium.

4. The system of embodiment 1, wherein the non-volatile storage medium is a solid state drive.

5. The system of embodiment 1, wherein a first write speed associated with the RAM storage medium is faster than a second write speed associated with the non-volatile storage medium.

6. The system of embodiment 1, wherein:
   the first memory allocation function is associated with a first library file including instructions for allocating memory on the RAM storage medium, the first library file being stored in a library of a programming language; and
   the one or more programs include instructions for storing a second library file in the library, wherein the second library file is associated with the second memory allocation function and includes instructions for allocating memory on the non-volatile storage medium.

7. The system of embodiment 1, wherein the one or more programs include instructions for determining whether the first memory allocation function should be replaced with a second memory allocation function.

8. The system of embodiment 7, wherein the determining includes determining that the first memory allocation function should be replaced if an amount of memory to be allocated is not available in the RAM storage medium.

9. The system of embodiment 8, wherein the determining includes determining that the first memory allocation function should be replaced with the second memory allocation function if the amount of memory to be allocated is available in the non-volatile storage medium.

10. The system of embodiment 7, wherein determining whether the first memory allocation function should be replaced with a second memory allocation function includes selecting the second memory allocation function, from among a plurality of other memory allocation functions, when the non-volatile storage medium associated with the second memory allocation function has a faster read/write time than storage media associated with the plurality of other memory allocation functions.

11. A method, performed at a system comprising one or more processors, a RAM storage medium, and a non-volatile storage medium, the method comprising:
   receiving program code including a first memory allocation function for allocating memory in the RAM storage medium;
   replacing the first memory allocation function with a second memory allocation function for allocating memory in the non-volatile storage medium; and
   executing the program code including the second memory allocation to allocate memory in the non-volatile storage medium.

12. The method of embodiment 11, wherein:
   the RAM storage medium communicates with the one or more processors via a first bus, and the first memory allocation function causes the system to allocate memory over the first bus; and
   the non-volatile storage medium communicates with the one or more processors via a second bus, and the second memory allocation function causes the system to allocate memory over the second bus.

13. The method of embodiment 11, wherein the RAM storage medium is a volatile storage medium.

14. The method of embodiment 11, wherein the non-volatile storage medium is a solid state drive.

15. The method of embodiment 11, wherein a first write speed associated with the RAM storage medium is faster than a second write speed associated with the non-volatile storage medium.

16. The method of embodiment 11, wherein:
the first memory allocation function is associated with a first library file including instructions for allocating memory on the RAM storage medium, the first library file being stored in a library of a programming language; and
the method further comprises storing a second library file in the library, wherein the second library file is associated with the second memory allocation function and includes instructions for allocating memory on the non-volatile storage medium.

17. The method of embodiment 11, further comprising determining whether the first memory allocation function should be replaced with a second memory allocation function.

18. The method of embodiment 17, wherein the determining includes determining that the first memory allocation function should be replaced if an amount of memory to be allocated is not available in the RAM storage medium.

19. The method of embodiment 18, wherein the determining includes determining that the first memory allocation function should be replaced with the second memory allocation function if the amount of memory to be allocated is available in the non-volatile storage medium.

20. The method of embodiment 17, wherein determining whether the first memory allocation function should be replaced with a second memory allocation function includes selecting the second memory allocation function, from among a plurality of other memory allocation functions, when the non-volatile storage medium associated with the second memory allocation function has a faster read/write time than storage media associated with the plurality of other memory allocation functions.

21. A non-transitory computer-readable storage medium storing one or more programs configured to be executed by one or more processors of a device with a RAM storage medium and a non-volatile storage medium, the one or more programs including instructions for:
receiving program code including a first memory allocation function for allocating memory in the RAM storage medium;
replacing the first memory allocation function with a second memory allocation function for allocating memory in the non-volatile storage medium; and
executing the program code including the second memory allocation to allocate memory in the non-volatile storage medium.

22. The non-transitory computer-readable storage medium of embodiment 21, wherein:
the RAM storage medium communicates with the one or more processors via a first bus, and the first memory allocation function causes the system to allocate memory over the first bus; and
the non-volatile storage medium communicates with the one or more processors via a second bus, and the second memory allocation function causes the system to allocate memory over the second bus.

23. The non-transitory computer-readable storage medium of embodiment 21, wherein the RAM storage medium is a volatile storage medium.

24. The non-transitory computer-readable storage medium of embodiment 21, wherein the non-volatile storage medium is a solid state drive.

25. The non-transitory computer-readable storage medium of embodiment 21, wherein a first write speed associated with the RAM storage medium is faster than a second write speed associated with the non-volatile storage medium.

26. The non-transitory computer-readable storage medium of embodiment 21, wherein:
the first memory allocation function is associated with a first library file including instructions for allocating memory on the RAM storage medium, the first library file being stored in a library of a programming language; and
the one or more programs include instructions for storing a second library file in the library, wherein the second library file is associated with the second memory allocation function and includes instructions for allocating memory on the non-volatile storage medium.

27. The non-transitory computer-readable storage medium of embodiment 21, wherein the one or more programs include instructions for determining whether the first memory allocation function should be replaced with a second memory allocation function.

28. The non-transitory computer-readable storage medium of embodiment 27, wherein the determining includes determining that the first memory allocation function should be replaced if an amount of memory to be allocated is not available in the RAM storage medium.

29. The non-transitory computer-readable storage medium of embodiment 28, wherein the determining includes determining that the first memory allocation function should be replaced with the second memory allocation function if the amount of memory to be allocated is available in the non-volatile storage medium.

30. The non-transitory computer-readable storage medium of embodiment 27, wherein determining whether the first memory allocation function should be replaced with a second memory allocation function includes selecting the second memory allocation function, from among a plurality of other memory allocation functions, when the non-volatile storage medium associated with the second memory allocation function has a faster read/write time than storage media associated with the plurality of other memory allocation functions.

31. A computer system comprising:
one or more processors;
a RAM storage medium;
a non-volatile storage medium; and
one or more programs, wherein the one or more programs are stored in the non-volatile storage medium and configured to be executed by the one or more processors, the one or more programs including instructions for:
  receiving a first request to store data in memory in the RAM storage medium;
  in response to receiving the first request, storing the data in the non-volatile storage medium,
  receiving a second request to retrieve stored data from memory in the RAM storage medium; and
  in response to receiving the second request, retrieving the stored data from memory in the non-volatile storage medium.

32. The system of embodiment 31, wherein:
the RAM storage medium communicates with the one or more processors via a first bus, and the request to store data in memory in the RAM storage medium requests allocating memory over the first bus; and
the non-volatile storage medium communicates with the one or more processors via a second bus, and storing the data in the non-volatile storage medium comprises allocating memory over the second bus.

33. The system of embodiment 31, wherein the RAM storage medium is a volatile storage medium.

34. The system of embodiment 31, wherein the non-volatile storage medium is a solid state drive.

35. The system of embodiment 31, wherein a first write speed associated with the RAM storage medium is faster than a second write speed associated with the non-volatile storage medium.

36. The system of embodiment 31, wherein the one or more programs include instructions for, in response to receiving the request to store data in memory in the RAM storage medium, determining whether the system should store the data in the non-volatile storage medium instead.

37. The system of embodiment 31, wherein the one or more programs include instructions for, in response to receiving the request to retrieve data from memory in the RAM storage medium, determining whether the system should retrieve the data from the non-volatile storage medium instead.

38. The system of embodiment 36, wherein the determining includes determining that the system should store the data in the non-volatile storage medium if an amount of memory to be allocated is not available in the RAM storage medium.

39. The system of embodiment 38, wherein the determining includes determining that the system should store the data in the non-volatile storage medium if the amount of memory to be allocated is available in the non-volatile storage medium.

40. The system of embodiment 36, wherein the determining includes selecting the non-volatile storage medium, from among a plurality of other non-volatile storage mediums, when the non-volatile storage medium has a faster read/write time than the plurality of other non-volatile storage mediums.

41. A method, performed at a system comprising one or more processors, a RAM storage medium, and a non-volatile storage medium, the method comprising:
   receiving a first request to store data in memory in the RAM storage medium;
   in response to receiving the first request, storing the data in the non-volatile storage medium,
   receiving a second request to retrieve stored data from memory in the RAM storage medium; and
   in response to receiving the second request, retrieving the stored data from memory in the non-volatile storage medium.

42. The method of embodiment 41, wherein:
   the RAM storage medium communicates with the one or more processors via a first bus, and the request to store data in memory in the RAM storage medium requests allocating memory over the first bus; and
   the non-volatile storage medium communicates with the one or more processors via a second bus, and storing the data in the non-volatile storage medium comprises allocating memory over the second bus.

43. The method of embodiment 41, wherein the RAM storage medium is a volatile storage medium.

44. The method of embodiment 41, wherein the non-volatile storage medium is a solid state drive.

45. The method of embodiment 41, wherein a first write speed associated with the RAM storage medium is faster than a second write speed associated with the non-volatile storage medium.

46. The method of embodiment 41, comprising, in response to receiving the request to store data in memory in the RAM storage medium, determining whether the system should store the data in the non-volatile storage medium instead.

47. The method of embodiment 41, wherein the one or more programs include instructions for, in response to receiving the request to retrieve data from memory in the RAM storage medium, determining whether the system should retrieve the data from the non-volatile storage medium instead.

48. The method of embodiment 46, wherein the determining includes determining that the system should store the data in the non-volatile storage medium if an amount of memory to be allocated is not available in the RAM storage medium.

49. The method of embodiment 48, wherein the determining includes determining that the system should store the data in the non-volatile storage medium if the amount of memory to be allocated is available in the non-volatile storage medium.

50. The method of embodiment 46, wherein the determining includes selecting the non-volatile storage medium, from among a plurality of other non-volatile storage mediums, when the non-volatile storage medium has a faster read/write time than the plurality of other non-volatile storage mediums.

51. A non-transitory computer-readable storage medium storing one or more programs configured to be executed by one or more processors of a device with a RAM storage medium and a non-volatile storage medium, the one or more programs including instructions for:
   receiving a first request to store data in memory in the RAM storage medium;
   in response to receiving the first request, storing the data in the non-volatile storage medium,
   receiving a second request to retrieve stored data from memory in the RAM storage medium; and
   in response to receiving the second request, retrieving the stored data from memory in the non-volatile storage medium.

52. The computer-readable storage medium of embodiment 51, wherein:
   the RAM storage medium communicates with the one or more processors via a first bus, and the request to store data in memory in the RAM storage medium requests allocating memory over the first bus; and
   the non-volatile storage medium communicates with the one or more processors via a second bus, and storing the data in the non-volatile storage medium comprises allocating memory over the second bus.

53. The computer-readable storage medium of embodiment 51, wherein the RAM storage medium is a volatile storage medium.

54. The computer-readable storage medium of embodiment 51, wherein the non-volatile storage medium is a solid state drive.

55. The computer-readable storage medium of embodiment 51, wherein a first write speed associated with the RAM storage medium is faster than a second write speed associated with the non-volatile storage medium.

56. The computer-readable storage medium of embodiment 51, the one or more programs including instructions for, in response to receiving the request to store data in memory in the RAM storage medium, determining whether the system should store the data in the non-volatile storage medium instead.

57. The computer-readable storage medium of embodiment 51, wherein the one or more programs include instructions for, in response to receiving the request to retrieve data from memory in the RAM storage medium, determining whether the system should retrieve the data from the non-volatile storage medium instead.

58. The computer-readable storage medium of embodiment 56, wherein the determining includes determining that the system should store the data in the non-volatile storage medium if an amount of memory to be allocated is not available in the RAM storage medium.

59. The computer-readable storage medium of embodiment 58, wherein the determining includes determining that the system should store the data in the non-volatile storage medium if the amount of memory to be allocated is available in the non-volatile storage medium.

60. The computer-readable storage medium of embodiment 56, wherein the determining includes selecting the non-volatile storage medium, from among a plurality of other non-volatile storage mediums, when the non-volatile storage medium has a faster read/write time than the plurality of other non-volatile storage mediums.

61. A computer system comprising:
   one or more processors;
   a RAM storage medium;
   a non-volatile storage medium;
   a library of a programming language, the library stored on the non-volatile storage medium, wherein the library includes a first library file associated with a first memory allocation function, and wherein the first library file includes instructions for allocating memory on the RAM storage medium; and
   one or more programs, wherein the one or more programs are stored in the non-volatile storage medium and configured to be executed by the one or more processors, the one or more programs including instructions for:
      storing a second library file in the library, wherein the second library file is associated with a second memory allocation function, and wherein the second library file includes instructions for allocating memory in the non-volatile storage medium;
      storing program code on the non-volatile storage medium, the program code including the second memory allocation function; and
      executing the program code including the second memory allocation to allocate memory in the non-volatile storage medium.

62. A method, performed at a system comprising one or more processors, a RAM storage medium, a non-volatile storage medium, and a library of a programming language, wherein the library includes a first library file associated with a first memory allocation function, and wherein the first library file includes instructions for allocating memory on the RAM storage medium, the method comprising:
   storing a second library file in the library, wherein the second library file is associated with a second memory allocation function, and wherein the second library file includes instructions for allocating memory in the non-volatile storage medium;
   storing program code, the program code including the second memory allocation function; and
   executing the program code including the second memory allocation to allocate memory in the non-volatile storage medium.

63. A non-transitory computer-readable storage medium storing one or more programs configured to be executed by one or more processors of a device with a RAM storage medium, a non-volatile storage medium, and a library of a programming language, wherein the library includes a first library file associated with a first memory allocation function, and wherein the first library file includes instructions for allocating memory on the RAM storage medium, the one or more programs including instructions for:
   storing a second library file in the library, wherein the second library file is associated with a second memory allocation function, and wherein the second library file includes instructions for allocating memory in the non-volatile storage medium;
   storing program code, the program code including the second memory allocation function; and
   executing the program code including the second memory allocation to allocate memory in the non-volatile storage medium.

64. A computer system comprising:
   one or more processors;
   a RAM storage medium;
   a non-volatile storage medium;
   a library of a programming language, the library stored on the non-volatile storage medium, wherein the library includes a library file associated with a memory allocation function, wherein the library file includes instructions for allocating memory on the RAM storage medium; and
   one or more programs, wherein the one or more programs are stored in the non-volatile storage medium and configured to be executed by the one or more processors, the one or more programs including instructions for:
      modifying the library file to replace the instructions for allocating memory on the RAM storage medium with instructions for allocating memory in the non-volatile storage medium;
      storing program code on the non-volatile storage medium, the program code including the memory allocation function; and
      executing the program code including the memory allocation to allocate memory in the non-volatile storage medium.

65. A method, performed at a system comprising one or more processors, a RAM storage medium, a non-volatile storage medium, and a library of a programming language, wherein the library includes a library file associated with a memory allocation function, and wherein the library file includes instructions for allocating memory on the RAM storage medium, the method comprising:
   modifying the library file to replace the instructions for allocating memory on the RAM storage medium with instructions for allocating memory in the non-volatile storage medium;
   storing program code on the non-volatile storage medium, the program code including the memory allocation function; and
   executing the program code including the memory allocation to allocate memory in the non-volatile storage medium.

66. A non-transitory computer-readable storage medium storing one or more programs configured to be executed by one or more processors of a device with a RAM storage medium, a non-volatile storage medium, and a library of a programming language, wherein the library includes a library file associated with a memory allocation function, and wherein the library file includes instructions for allocating memory on the RAM storage medium, the one or more programs including instructions for:
   modifying the library file to replace the instructions for allocating memory on the RAM storage medium with instructions for allocating memory in the non-volatile storage medium;
   storing program code on the non-volatile storage medium, the program code including the memory allocation function; and
   executing the program code including the memory allocation to allocate memory in the non-volatile storage medium.

What is claimed is:

1. A computer system comprising:
one or more processors;
a RAM storage medium; and
a non-volatile storage medium storing first instructions configured to be executed by the one or more processors to cause the system to:
receive program code including a first memory allocation function for causing the program code to allocate, during execution of the program code, memory in the RAM storage medium;
determine, based on an amount of memory to be allocated for executing the program code, whether the first memory allocation function in the program code should be replaced with a second memory allocation function for causing the program code to allocate, during execution of the program code, memory in the non-volatile storage medium;
in response to determining to replace the first memory allocation function in the program code, modify the program code to replace the first memory allocation function with the second memory allocation function for causing the program code to allocate, during execution of the program code, memory in the non-volatile storage medium; and
execute the modified program code including the second memory allocation function to allocate memory in the non-volatile storage medium.

2. The system of claim 1, wherein:
the RAM storage medium communicates with the one or more processors via a first bus, and the first memory allocation function causes the system to allocate memory over the first bus; and
the non-volatile storage medium communicates with the one or more processors via a second bus, and the second memory allocation function causes the system to allocate memory over the second bus.

3. The system of claim 1, wherein the non-volatile storage medium is a solid state drive.

4. The system of claim 1, wherein a first write speed associated with the RAM storage medium is faster than a second write speed associated with the non-volatile storage medium.

5. The system of claim 1, wherein:
the first memory allocation function is associated with a first library file including second instructions for allocating memory on the RAM storage medium, the first library file being stored in a library of a programming language; and
the first instructions are configured to cause the system to store a second library file in the library, wherein the second library file is associated with the second memory allocation function and includes third instructions for allocating memory on the non-volatile storage medium.

6. The system of claim 1, wherein the determining includes determining that the first memory allocation function in the program code should be replaced if the amount of memory to be allocated is not available in the RAM storage medium and is available in the non-volatile storage medium.

7. The system of claim 1, wherein determining whether the first memory allocation function in the program code should be replaced with the second memory allocation function includes selecting the second memory allocation function, from among a plurality of other memory allocation functions, when the non-volatile storage medium associated with the second memory allocation function has a faster read/write time than storage media associated with the plurality of other memory allocation functions.

8. A method, performed at a system comprising one or more processors, a RAM storage medium, and a non-volatile storage medium, the method comprising:
receiving program code including a first memory allocation function for causing the program code to allocate, during execution of the program code, memory in the RAM storage medium;
determining, based on an amount of memory to be allocated for executing the program code, whether the first memory allocation function in the program code should be replaced with a second memory allocation function for causing the program code to allocate, during execution of the program code, memory in the non-volatile storage medium;
in response to determining to replace the first memory allocation function in the program code, modifying the program code to replace the first memory allocation function with the second memory allocation function for causing the program code to allocate, during execution of the program code, memory in the non-volatile storage medium; and
executing the modified program code including the second memory allocation function to allocate memory in the non-volatile storage medium.

9. The method of claim 8, wherein:
the RAM storage medium communicates with the one or more processors via a first bus, and the first memory allocation function causes the system to allocate memory over the first bus; and
the non-volatile storage medium communicates with the one or more processors via a second bus, and the second memory allocation function causes the system to allocate memory over the second bus.

10. The method of claim 8, wherein the RAM storage medium is a volatile storage medium.

11. The method of claim 8, wherein the non-volatile storage medium is a solid state drive.

12. The method of claim 8, wherein a first write speed associated with the RAM storage medium is faster than a second write speed associated with the non-volatile storage medium.

13. The method of claim 8, comprising:
storing a first library file associated with the first memory allocation function in a library of a programming language, wherein the first library file comprises instructions for allocating memory on the RAM storage medium; and
storing a second library file associated with the second memory allocation function in the library, wherein the second library file comprises instructions for allocating memory on the non-volatile storage medium.

14. The method of claim 8, wherein determining whether the first memory allocation function in the program code should be replaced comprises determining that the first memory allocation function in the program code should be replaced if the amount of memory to be allocated is not available in the RAM storage medium and is available in the non-volatile storage medium.

15. The method of claim 8, wherein determining whether the first memory allocation function in the program code should be replaced with the second memory allocation function comprises selecting the second memory allocation function, from among a plurality of other memory allocation functions, when the non-volatile storage medium associated with the second memory allocation function has a faster read/write time than storage media associated with the plurality of other memory allocation functions.

16. A non-transitory computer-readable storage medium storing instructions configured to be executed by one or more processors of a device with a RAM storage medium and a non-volatile storage medium, the instructions being configured to cause the system to:
receive program code including a first memory allocation function for causing the program code to allocate, during execution of the program code, memory in the RAM storage medium;
determine, based on an amount of memory to be allocated for executing the program code, whether the first memory allocation function in the program code should be replaced with a second memory allocation function for causing the program code to allocate, during execution of the program code, memory in the non-volatile storage medium;
in response to determining to replace the first memory allocation function in the program code, modify the program code to replace the first memory allocation function with the second memory allocation function for causing the program code to allocate, during execution of the program code, memory in the non-volatile storage medium; and
execute the modified program code including the second memory allocation function to allocate memory in the non-volatile storage medium.

* * * * *